United States Patent

Kurtz et al.

[11] 4,201,710
[45] May 6, 1980

[54] AZO DYES OF THE PYRIDONE SERIES USEFUL FOR FLOWABLE PRINTING INKS

[75] Inventors: Walter Kurtz, Bad Durkheim; Dieter Horn; Walter Ditter, both of Heidelberg, all of Fed. Rep. of Germany

[73] Assignee: BASF Aktiengesellschaft, Ludwigshafen, Fed. Rep. of Germany

[21] Appl. No.: 898,672

[22] Filed: Apr. 21, 1978

[30] Foreign Application Priority Data

May 14, 1977 [DE] Fed. Rep. of Germany ....... 2721955

[51] Int. Cl.² ............................................. C09B 29/36
[52] U.S. Cl. ..................................... 260/156; 106/22; 106/23; 260/154; 260/146 R; 260/146 D
[58] Field of Search ................... 260/154, 156, 146 R, 260/146 D; 106/22, 23

[56] References Cited

U.S. PATENT DOCUMENTS 4,032,532  6/1977  Burkhard et al. ............... 260/156 X

FOREIGN PATENT DOCUMENTS 1927213 12/1969  Fed. Rep. of Germany ........... 260/156
2457687  6/1976  Fed. Rep. of Germany ........... 260/156

Primary Examiner—Arthur P. Demers

Attorney, Agent, or Firm—Oblon, Fisher, Spivak, McClelland & Maier

[57] ABSTRACT

Azo dyes which in the form of the free bases correspond to the general formula

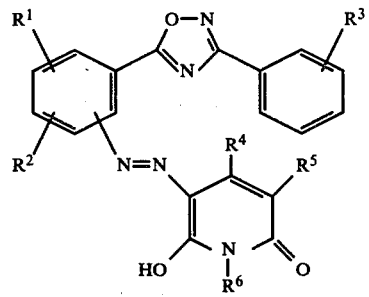

where $R^1$ is hydrogen, chlorine, bromine, methyl, trifluoromethyl, methoxy, nitro or a radical X, $R^2$ is hydrogen, chlorine or nitro, $R^3$ is hydrogen, chlorine, bromine, methyl, methoxy, nitro or a radical X, $R^4$ is hydrogen or alkyl of 1 to 3 carbon atoms, $R^5$ is cyano, carbamoyl or acetyl, $R^6$ is hydrogen, substituted or unsubstituted alkyl or cycloalkyl or a radical X and X is a radical containing an amino group, the molecule containing at least one radical X. The compounds of the formula I are exceptionally useful for improving the flow of pigment-containing printing inks.

10 Claims, No Drawings

AZO DYES OF THE PYRIDONE SERIES USEFUL FOR FLOWABLE PRINTING INKS

SUMMARY OF THE INVENTION

The present invention relates to compounds which in the form of the free bases correspond to the general formula I

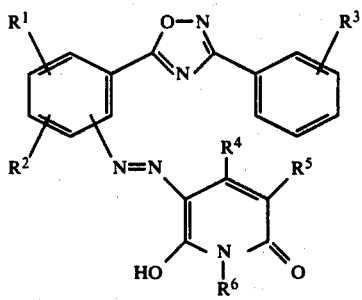

where $R^1$ is hydrogen, chlorine, bromine, methyl, trifluoromethyl, methoxy, nitro or a radical X, $R^2$ is hydrogen, chlorine or nitro, $R^3$ is hydrogen, chlorine, bromine, methyl, methoxy, nitro or a radical X, $R^4$ is hydrogen or alkyl of 1 to 3 carbon atoms, $R^5$ is cyano, carbamoyl or acetyl, $R^6$ is hydrogen, substituted or unsubstituted alkyl or cycloalkyl or a radical X and X is a radical containing an amino group, and where the molecule contains at least one radical X.

DESCRIPTION OF THE PREFERRED EMBODIMENTS

Examples of alkyl $R^4$ are propyl, ethyl and especially methyl. Examples of $R^6$ are, in addition to hydrogen and the radicals X, alkyl of 1 to 16 carbon atoms (which is unsubstituted or substituted by hydroxyl or alkoxy of 1 to 8 carbon atoms), cyclohexyl, benzyl and phenylethyl. Specific examples are $CH_3$, $C_2H_5$, $C_3H_7$, $C_4H_9$, $C_5H_{11}$, $C_6H_{13}$, $C_8H_{17}$, $C_{12}H_{25}$, $C_{16}H_{33}$, $CH_2CH_2OH$, $CH_2CH_2OCH_3$, $CH_2CH_2OC_4H_9$, $(CH_2)_3OH$, $(CH_2)_3OCH_3$, $(CH_2)_3OC_2H_5$, $(CH_2)_3OC_3H_7$, $(CH_2)_3OC_4H_9$,

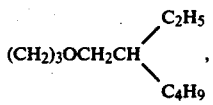

$(CH_2)_3OC_8H_{17}$ and $CH_2CHOHCH_3$. Preferably, $R^6$ is hydrogen, a radical X or $CH_3$, $C_2H_5$, $C_3H_7$, $C_4H_9$, $C_5H_{11}$,

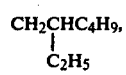

$C_2H_4OCH_3$ or $C_3H_6OC_2H_5$. Examples of radicals X are aminoalkyl, alkylaminoalkyl, dialkylaminoalkyl, cycloalkylaminoalkyl and aralkylaminoalkyl, as well as radicals which contain nitrogen as a ring member, and polyaminoalkyl. All these radicals, except $R^6$, may also be bonded to the aromatic nucleus via the bridge members —$SO_2NH$— or —$CONH$—. Alkyl in the radicals X may in addition be substituted, for example by hydroxyl, alkoxy of 1 to 8 carbon atoms or phenoxy, or be interrupted by oxygen.

The radicals X as a rule are of a total of 1 to 18, preferably 3 to 15, and especially 3 to 12, carbon atoms. In polyaminoalkyl, the alkyl chain is interrupted by NH groups; radicals which contain nitrogen as a ring member are preferably saturated.

Specific examples of radicals X are $CH_2NH_2$, $CH_2NHCH_3$, $CH_2NHC_2H_5$, $CH_2NHC_5H_{13}$, $CH_2NHC_8H_{17}$,

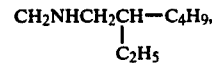

$CH_2NHC_{13}H_{27}$, $CH_2N(CH_3)_2$, $CH_2N(C_2H_5)_2$, $CH_2N(C_3H_7)_2$, $CH_2N(C_4H_9)_2$, $CH_2N(C_5H_{11})_2$, $CH_2N(C_6H_{13})_2$, $CH_2N(C_7H_{15})_2$, $CH_2N(C_8H_{17})_2$, $CH_2N(C_2H_4OCH_3)_2$, $CH_2N(C_2H_4OC_2H_5)_2$, $CH_2N(C_2H_4OC_3H_7)_2$,

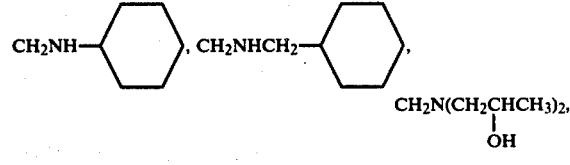

$CH_2N(CH_2CH_2OH)_2$, $C_2H_4NH_2$, $C_2H_4NHCH_3$, $C_2H_4NHC_2H_5$, $C_2H_4NHC_3H_7$, $C_2H_4N(CH_3)_2$, $C_2H_4N(C_2H_5)_2$, $C_2H_4N(C_4H_9)_2$, $C_2H_4N(C_5H_{10})_2$, $C_3H_6NH_2$, $C_3H_6NHCH_3$, $C_3H_6NHC_2H_5$,

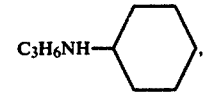

$C_3H_6N(CH_3)_2$, $C_3H_6N(C_2H_5)_2$, $C_3H_6N(C_3H_7)_2$, $C_3H_6N(C_4H_9)_2$, $C_4H_8N(CH_3)_2$, $C_4H_8N(C_2H_5)_2$, $C_4H_8N(C_3H_7)_2$, $CH_2NH$-$C_2H_4$-$NH_2$, $CH_2NHC_2H_4N(CH_3)_2$, $CH_2NHC_3H_6NHCH_3$, $CH_2NHC_3H_6N(CH_3)_2$, $CH_2NHC_3H_6N(C_2H_5)_2$, $CH_2NHC_4H_8N(CH_3)_2$, $CH_2NHC_4H_8N(C_2H_5)_2$,

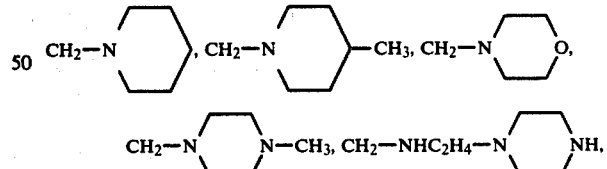

$CH_2NHC_2H_4NHC_2H_4NH_2$,
$CH_2NHC_3H_6NHC_3H_6NH_2$, $CH_2NHC_3H_6OC_4H_8OC_3H_6NH_2$, $C_2H_4NHC_3H_6NH_2$, $C_3H_6NHC_3H_6NH_2$, $C_3H_6NHC_2H_4NHC_3H_6NH_2$, $C_3H_6NHC_3H_6NHC_3H_6NH_2$, $C_3H_6NHC_3H_6NHC_3H_6NHC_3H_6NH_2$, $SO_2NHC_2H_4NH_2$, $SO_2NHC_2H_4N(CH_3)_2$, $SO_2NHC_2H_4N(C_2H_5)_2$, $SO_2NHC_3H_6NHCH_3$, $SO_2NHC_3H_6N(CH_3)_2$, $SO_2NHC_3H_6N(C_2H_5)_2$, $SO_2NHC_3H_6N(C_3H_7)_2$, $SO_2NHC_3H_6N(C_4H_9)_2$, $SO_2NHC_4H_8NHCH_3$, $SO_2NHC_4H_8NHC_2H_5$, $SO_2NHC_4H_8N(CH_3)_2$, $SO_2NHC_4H_8N(C_2H_5)_2$,

SO$_2$NHC$_3$H$_6$NH—⟨cyclohexyl⟩, SO$_2$NHC$_2$H$_4$—N(piperazine)N—CH$_3$,

SO$_2$—N(piperazine)NCH$_3$

CO$_2$NHC$_2$H$_4$NH$_2$, CO$_2$NHC$_2$H$_4$N(CH$_3$)$_2$,
CO$_2$NHC$_2$H$_4$N(C$_2$H$_5$)$_2$, CO$_2$NHC$_3$H$_6$NHCH$_3$,
CO$_2$NHC$_3$H$_6$N (CH$_3$)$_2$, CO$_2$NHC$_3$H$_6$N(C$_2$H$_5$)$_2$,
CO$_2$NHC$_3$H$_6$N(C$_3$H$_7$)$_2$, CO$_2$NHC$_3$H$_6$N(C$_4$H$_9$)$_2$,
CO$_2$NHC$_4$H$_8$NHCH$_3$, CO$_2$NHC$_4$H$_8$NHC$_2$H$_5$,
CO$_2$NHC$_4$H$_8$N(CH$_3$)$_2$, CO$_2$NHC$_4$H$_8$N(C$_2$H$_5$)$_2$,

CO$_2$NHC$_3$H$_6$NH—⟨cyclohexyl⟩,

CO$_2$NHC$_2$H$_4$—N(piperazine)N—CH$_3$ and CO$_2$—N(piperazine)N—CH.

Examples of preferred radicals X are CH$_2$N(CH$_3$)$_2$, CH$_2$N(C$_2$H$_5$)$_2$, CH$_2$N(C$_3$H$_7$)$_2$, CH$_2$N(C$_4$H$_9$)$_2$, CH$_2$N(C$_5$H$_{11}$)$_2$, CH$_2$N(C$_2$H$_4$OCH$_3$)$_2$, C$_2$H$_4$N(CH$_3$)$_2$, C$_2$H$_4$N(C$_2$H$_5$)$_2$, C$_2$H$_4$N(C$_4$H$_9$)$_2$, C$_3$H$_7$NHCH$_3$, C$_3$H$_7$NH—⟨cyclohexyl⟩, C$_3$H$_7$N(CH$_3$)$_2$, C$_3$H$_7$N(C$_2$H$_5$)$_2$, C$_3$H$_7$N(C$_3$H$_7$)$_2$,
C$_3$H$_7$N(C$_4$H$_9$)$_2$, C$_4$H$_9$N(C$_2$H$_5$)$_2$,
CH$_2$NHC$_2$H$_4$N(CH$_3$)$_2$, CH$_2$NHC$_3$H$_7$N(CH$_3$)$_2$,
CH$_2$NHC$_3$H$_7$N(C$_2$H$_5$)$_2$, CH$_2$NHC$_4$H$_9$N(C$_2$H$_5$)$_2$, CH$_2$—N(piperidine), CH$_2$—N(piperazine)N—CH$_3$, CH$_2$NHC$_2$H$_4$—N(piperazine)NH, SO$_2$NHC$_2$H$_4$N(CH$_3$)$_2$, SO$_2$NHC$_2$H$_4$N(C$_2$H$_5$)$_2$,
SO$_2$NHC$_3$H$_6$N(CH$_3$)$_2$, SO$_2$NHC$_3$H$_6$N(C$_2$H$_5$)$_2$,
SO$_2$NHC$_3$H$_6$N(C$_4$H$_9$)$_2$, SO$_2$NHC$_4$H$_8$N(C$_2$H$_5$)$_2$
SO$_2$NHC$_4$H$_8$N(CH$_3$)$_2$, SO$_2$NCH$_2$H$_4$—N(piperazine)N—CH$_3$, SO$_2$—N(piperazine)N—CH$_3$, CO$_2$NHC$_2$H$_4$N(CH$_3$)$_2$, CO$_2$NHC$_2$H$_4$N(C$_2$H$_5$)$_2$,
CO$_2$NHC$_3$H$_6$N(CH$_3$)$_2$, CO$_2$NHC$_3$H$_6$N(C$_2$H$_5$)$_2$,
CO$_2$NHC$_3$H$_6$N(C$_4$H$_9$)$_2$ CO$_2$NHC$_4$H$_8$N(C$_2$H$_5$)$_2$,
CO$_2$NHC$_4$H$_8$N(CH$_3$)$_2$, CO$_2$NHC$_2$H$_4$—N(piperazine)N—CH$_3$, CO$_2$—N(piperazine)N—CH$_3$, C$_3$H$_6$NHC$_2$H$_4$NHC$_3$H$_6$NH$_2$,
C$_3$H$_6$NHC$_3$H$_6$NHC$_3$H$_6$NH$_2$ and
C$_3$H$_6$NHC$_3$H$_6$NHC$_3$H$_6$NHC$_3$H$_6$NH$_2$.

The compounds of the formual I can be manufactured by coupling a diazonium compound of an amine of the formula II

[Structure: oxadiazole with two phenyl substituents bearing R$^1$, R$^2$, R$^3$ and NH$_2$]

with a compound of the formula III

[Structure: pyridone with HO, R$^4$, R$^5$, R$^6$, N, O substituents]

The diazotization and coupling take place without unusual features; details can be found in the Examples, where parts and percentages are by weight, unless stated otherwise.

The radicals X are present in the individual components of the formula II and/or III. As a rule, they are introduced into the radicals R$^1$ and R$^3$ by means of halogen compounds, whilst they are introduced into R$^6$ during the preparation of the pyridones, in accordance with conventional methods. Some typical methods are described in the Examples.

The compounds of the formula I are exceptionally useful for improving the flow of pigments, to which they are as a rule added, for this purpose, in amounts of from 0.5 to 10%. They may be used in the form of the free bases or of salts, the salts being preferred in some cases. Suitable salts are, in particular, those with organic anions, preferably longchain alkylsulfonates or arylsulfonates. Specific examples of sulfonic acids from which these anions are derived are methanesulfonic acid, ethanesulfonic acid, butanesulfonic acid, octanesulfonic acid, decanesulfonic acid, dodecanesulfonic acid, tridecanesulfonic acid, hexadecanesulfonic acid, octadecanesulfonic acid, benzenesulfonic acid, α- and β-naphthalenesulfonic acid, o- and p-toluenesulfonic acid, xylenesulfonic acid, p-tert.-butylbenzenesulfonic acid, o-hydroxy-tert.-butylbenzenesulfonic acid, p-hexylbenzenesulfonic acid, octylbenzenesulfonic acid, nonylbenzenesulfonic acid, dodecylbenzenesulfonic acid, hexadecylbenzenesulfonic acid octadecylbenzenesulfonic acid, o-hydroxy-m,m'-bis-dodecylbenzenesulfonic acid, o-hydroxynonylbenzenesulfonic acid, o-hydroxydodecylbenzenesulfonic acid, hydroxy-hexadecylbenzenesulfonic acid, hydroxyoctadecylbenzenesulfonic acid, monoalkylnaphtholsulfonic acids and dialkylnaphtholsulfonic acids where alkyl is of 1 to 20 carbon atoms, 1-alkene-1-sulfonic acids of 8 to 20 carbon atoms and 2-hydroxy-alkane-1-sulfonic acids of 8 to 20 carbon atoms.

Compounds of particular industrial importance are those of the formula Ia

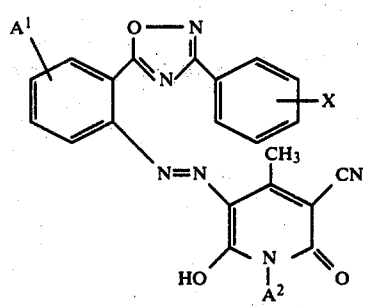

where $A^1$ is hydrogen, chlorine, bromine or nitro, $A^2$ is hydrogen, alkyl of 1 to 12 carbon atoms, cyclohexyl, benzyl or a radical X and X has the above meaning.

In the phenyl ring, the radical X is preferably in the p-position; preferably, the compounds of the formula I contain one radical X. General method for the manufacture of a compound of the formula II or III

Method A 151 parts of p-cyanobenzyl chloride are introduced into 200 parts of diethylamine and the mixture is refluxed for 2 hours. The excess amine is distilled off, the residue is dissolved in 300 parts of water and 250 parts of isobutanol and the solution is heated with 85 parts of hydroxylammonium sulfate, in the presence of 58 parts of technical-grade sodium carbonate and 10 parts of the sodium salt of diethylenetriaminopentaacetic acid for 5 hours. The mixture is allowed to cool to 50°, 150 parts of isatoic anhydride are introduced and the pH is then brought to 11 with 50 percent strength sodium hydroxide solution. The isobutanol is distilled off quantitatively by introducing steam; the mixture is then cooled to 10° C. and the solid is filtered off, washed with water and dried. 280 parts of the compound of the formula

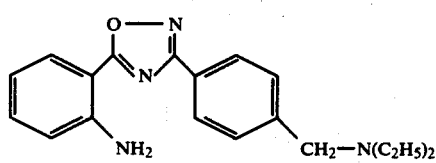

are obtained. The crude material melts at 62° C. whilst material recrystallized from alcohol/water melts at 69° C.

Method B 201 parts of 4-cyanobenzenesulfonic acid chloride are introduced slowly into 130 parts of diethylaminopropylamine, during which time the temperature rises to 60° C. The viscous reaction mixture is dissolved in 250 parts of isobutanol and 300 parts of water, and thereafter the procedure described for Method A is followed. After completion of the reaction, the mixture is neutralized with hydrochloric acid and the product is filtered off and dried. 292 parts of the compound of the formula

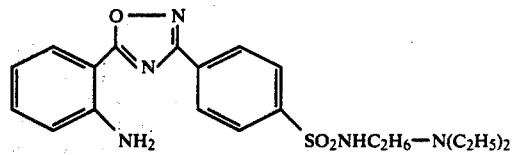

are obtained; its melting point is 102° C.

Method C 165 parts of m-cyanobenzoyl chloride are introduced dropwise, whilst cooling, into 260 parts of diethylaminopropylamine and the mixture is stirred for 3 hours at room temperature. 300 parts of isobutanol are then added and the organic phase is washed twice with 200 parts of water. The isobutanol phase is then reacted further with hydroxylammonium sulfate, water and sodium carbonate, as described for Method A. 310 parts of the compounds having the structure

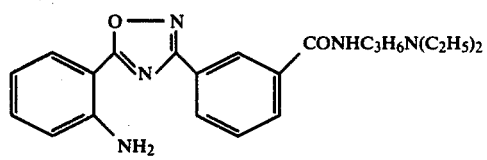

are isolated. After recrystallization from ethanol/water, the melting point is 160° C.

Method D 260 parts of diethylaminopropylamine are added dropwise to 226 parts of ethyl cyanoacetate in 300 parts of methanol at 35° C. and the mixture is then stirred for 2 hours at the same temperature; thereafter, 170 parts of piperidine and 260 parts of ethyl acetoacetate are added slowly and the mixture is refluxed for 12 hours. All the volatile constituents are then distilled off under reduced pressure. The residue crystallizes on standing in a refrigerator. 520 parts of the compound of the formula

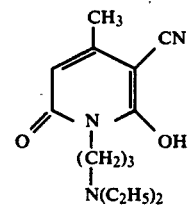

are isolated; the melting point is 175° C.

The diazo components referred to in the Examples which follow can be synthesized in accordance with the same principles.

EXAMPLE 1

35 parts of the amine of the formula

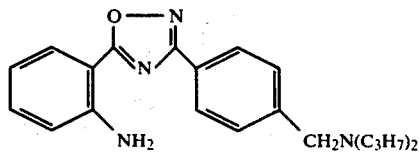

are stirred with 40 parts of concentrated hydrochloric acid and 150 parts of water for 30 minutes at 60° C. The mixture is then cooled to 0° C. with ice and diazotized by adding 30 parts by volume of a 23 percent strength NaNO₂ solution. After 3 hours, the excess nitrite is destroyed with amidosulfonic acid and a solution of 15 parts of dihydroxycyanomethylpyridine in a mixture of 400 parts of water and 60 parts of 2N sodium hydroxide solution is added slowly to the diazonium salt solution. The pH is brought to 6 with 2N sodium hydroxide solution, the mixture is stirred for 30 minutes and then brought to 60° C. by passage of steam, and 33 parts of dodecylbenzenesulfonic acid in 100 parts of water are added. The product is then filtered off and washed with water. 83 parts of the dye of the formula

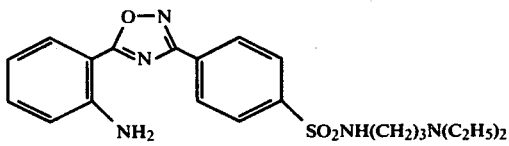

are dissolved in 80 parts of dimethylformamide and added dropwise to a well-stirred mixture of 200 parts of water, 500 parts of ice, 70 parts of glacial acetic acid and 48 parts of concentrated hydrochloric acid. The amine is then diazotized by adding 30 parts by volume of NaNO₂ and after about 3 hours excess nitrite is destroyed with amidosulfonic acid.

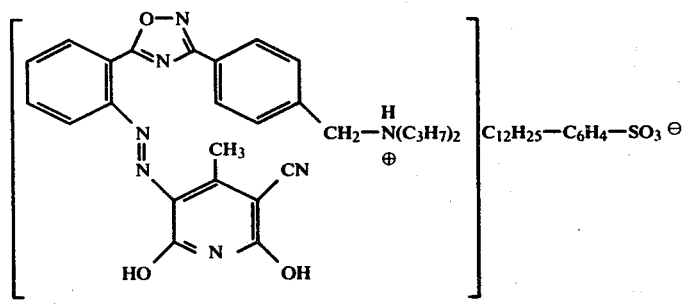

are obtained.

EXAMPLE 2

43 parts of the amine of the formula 15 parts of dihydroxycyanomethylpyridone, dissolved in a mixture of 300 parts of water and 60 parts of 2N sodium hydroxide solution, are added dropwise. The pH is then brought to 7 with 5N sodium hydroxide solution, the mixture is heated to 80° C. with steam and 33 parts of dodecylbenzenesulfonic acid in 100 parts of water are added. 88 parts of the dye of the formula

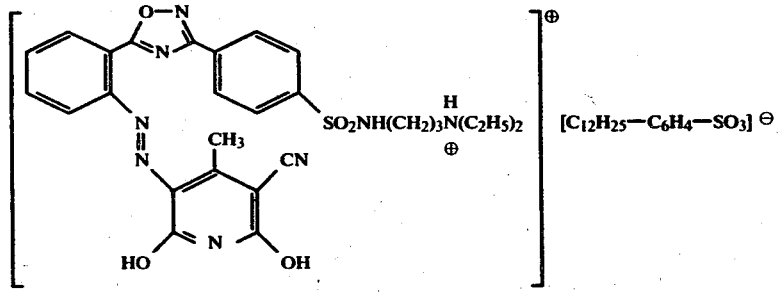

are obtained.

Using the method described in Example 2, yellow dyes are obtained from the diazo components and coupling components shown in the Table which follows.

| Ex. | Diazo component | Coupling component | Salt formed with |
|---|---|---|---|
| 3 | (structure with oxadiazole, NH₂, CH₂—N(CH₃)₂) | (pyridone with CH₃, CN, HO, OH) | hexadecylbenzenesulfonic acid |

-continued

| Ex. | Diazo component | Coupling component | Salt formed with |
|---|---|---|---|
| 4 | " | 3-CN, 2,6-dihydroxypyridine | dodecylbenzenesulfonic acid |
| 5 | " | 3-CN, 4-CH₃, 6-OH, 2-oxo, N-C₆H₁₃ pyridine | — |
| 6 | 5-(2-aminophenyl)-3-[2-(CH₂N(CH₃)₂)phenyl]-1,2,4-oxadiazole | 3-CN, 4-CH₃, 2,6-dihydroxypyridine | dodecylbenzenesulfonic acid |
| 7 | " | " | hexadecylbenzenesulfonic acid |
| 8 | " | 3-CN, 4-CH₃, 2-OH, 6-oxo, N-CH₃ pyridine | dodecanesulfonic acid |
| 9 | 5-(2-aminophenyl)-3-[3-(CH₂N(CH₃)₂)phenyl]-1,2,4-oxadiazole | 3-CN, 4-CH₃, 2,6-dihydroxypyridine | dodecylbenzenesulfonic acid |
| 10 | " | " | diisobutylnaphthalesulfonic acid |
| 11 | " | 3-CONH₂, 4-CH₃, 2-OH, 6-OH pyridine | diisobutylnaphthalenesulfonic acid |
| 12 | " | 3-CN, 4-CH₃, 2-OH, 6-oxo, N-C₁₂H₂₅ pyridine | — |
| 13 | 5-(2-aminophenyl)-3-[2-(CH₂—N(C₂H₅)₂)phenyl]-1,2,4-oxadiazole | 3-CN, 4-CH₃, 2,6-dihydroxypyridine | nonylbenzenesulfonic acid |
| 14 | " | 3-CN, 2,6-dihydroxypyridine | dodecylbenzenesulfonic acid |

-continued

| Ex. | Diazo component | Coupling component | Salt formed with |
|---|---|---|---|
| 15 | " | 4-methyl-3-acetyl-2,6-dihydroxypyridine (CH₃ and C(=O)CH₃ substituents; HO-, N, -OH) | octanesulfonic acid |
| 16 | 2-amino-phenyl-[1,3,4-oxadiazol-5-yl]-3-(diethylaminomethyl)phenyl (structure: phenyl with NH₂ ortho, linked via 1,2,4-oxadiazole to phenyl bearing CH₂N(C₂H₅)₂ at meta) | 4-methyl-3-cyano-2,6-dihydroxypyridine | dodecylbenzene-sulfonic acid |
| 17 | " | 3-carbamoyl-2,6-dihydroxypyridine (CONH₂; HO-, N, -OH) | dodecylbenzene-sulfonic acid |
| 18 | 2-amino-phenyl-[1,2,4-oxadiazol]-phenyl with para CH₂N(C₂H₅)₂ | 4-methyl-3-cyano-2,6-dihydroxypyridine | dodecylbenzene-sulfonic acid |
| 19 | " | " | alkylhexylnaphtha-sulfonic acid |
| 20 | " | 3-cyano-2,6-dihydroxypyridine (CN; HO-, N, -OH) | dodecylbenzene-sulfonic acid |
| 21 | " | 1-(3-ethoxypropyl)-4-methyl-3-cyano-6-hydroxy-2-pyridone (CH₃, CN; HO-, N-(CH₂)₃-O-C₂H₅, =O) | — |
| 22 | " | 1-hexadecyl-4-methyl-3-cyano-6-hydroxy-2-pyridone (CH₃, CN; HO-, N-C₁₆H₃₃, =O) | — |
| 23 | 4-chloro-2-amino-phenyl-[1,2,4-oxadiazol]-phenyl-CH₂-N(C₂H₅)₂ (para) | 4-methyl-3-cyano-2,6-dihydroxypyridine | dodecylbenzene-sulfonic acid |
| 24 | 3,5-dichloro-phenyl-[1,2,4-oxadiazol]-phenyl-CH₂N(C₂H₅)₂ (para) | " | dodecylbenzene-sulfonic acid |

-continued

| Ex. | Diazo component | Coupling component | Salt formed with |
|---|---|---|---|
| 25 | 4-nitro-2-(3-(4-diethylaminomethylphenyl)-1,2,4-oxadiazol-5-yl)aniline (O₂N, NH₂, CH₂N(C₂H₅)₂) | " | dodecylbenzenesulfonic acid |
| 26 | 4-trifluoromethyl-2-(3-(4-diethylaminomethylphenyl)-1,2,4-oxadiazol-5-yl)aniline (CF₃, NH₂, CH₂N(C₂H₅)₂) | " | dodecylbenzenesulfonic acid |
| 27 | 4,6-dinitro-2-(3-(4-diethylaminomethylphenyl)-1,2,4-oxadiazol-5-yl)aniline (O₂N, NO₂, NH₂, CH₂N(C₂H₅)₂) | " | dodecylbenzenesulfonic acid |
| 28 | 2-(3-(4-diethylaminomethylphenyl)-1,2,4-oxadiazol-5-yl)aniline (NH₂, CH₂N(C₂H₅)₂) | " | o-hydroxynonylbenzenesulfonic acid |
| 29 | 2-(3-(2-dipropylaminomethylphenyl)-1,2,4-oxadiazol-5-yl)aniline (NH₂, CH₂N(C₃H₇)₂) | " | dodecylbenzenesulfonic acid |
| 30 | 2-(3-(3-dipropylaminomethylphenyl)-1,2,4-oxadiazol-5-yl)aniline (NH₂, CH₂N(C₃H₇)₂) | " | dodecylbenzenesulfonic acid |
| 31 | 2-(3-(4-dipropylaminomethylphenyl)-1,2,4-oxadiazol-5-yl)aniline (NH₂, CH₂N(C₃H₇)₂) | " | p-tert.-butylphenolsulfonic acid |
| 32 | " | " | — |
| 33 | " | " | ethylhexylnaphthalene-1-sulfonic acid |
| 34 | " | 3-cyano-2,6-dihydroxypyridine (CN, HO, OH) | dodecylbenzenesulfonic acid |
| 35 | " | 3-cyano-4-methyl-6-hydroxy-1-butyl-2-pyridone (CH₃, CN, OH, C₄H₉) | dodecylbenzenesulfonic acid |

-continued

| Ex. | Diazo component | Coupling component | Salt formed with |
|---|---|---|---|
| 36 | " | 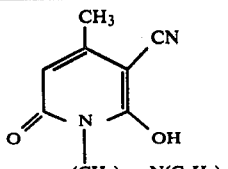 | dodecylbenzene-sulfonic acid |
| 37 | " | " | dodecylbenzene-sulfonic acid |
| 38 | " | " | 2 moles of dodecylbenzene-sulfonic acid |
| 39 | 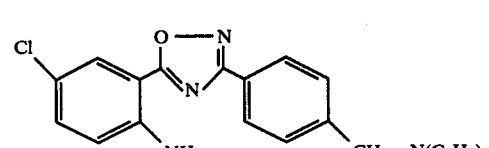 | 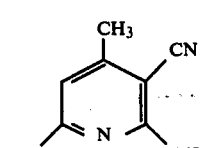 | dodecylbenzene-sulfonic acid |
| 40 | 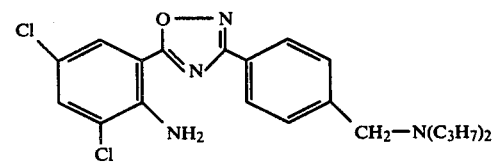 | " | dodecylbenzene-sulfonic acid |
| 41 | 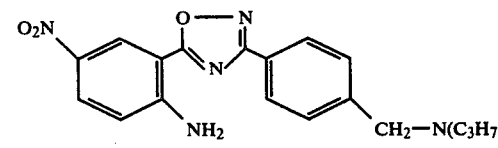 | " | dodecylbenzene-sulfonic acid |
| 42 | 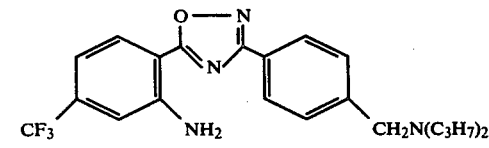 | " | dodecylbenzene-sulfonic acid |
| 43 | 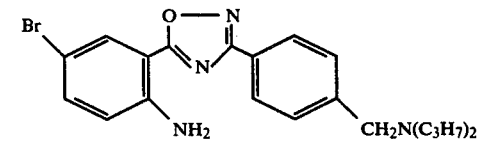 | " | dodecylbenzene sulfonic acid |
| 44 | 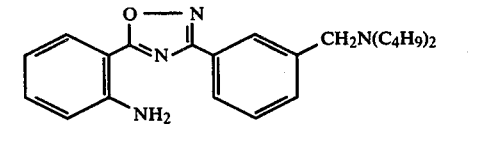 | " | dodecylbenzene-sulfonic acid |
| 45 | 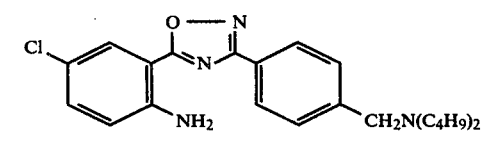 | " | dodecylbenzene-sulfonic acid |
| 46 | 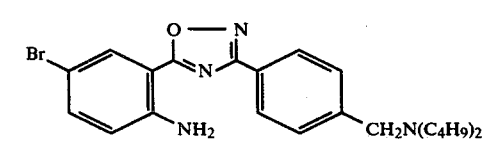 | " | dodecylbenzene sulfonic acid |

-continued

| Ex. | Diazo component | Coupling component | Salt formed with |
|---|---|---|---|
| 47 | 2-amino-phenyl-1,2,4-oxadiazol-3-yl, 4-(CH₂N(C₄H₉)₂)phenyl | " | dodecylbenzene-sulfonic acid |
| 48 | " | 3-cyano-2,6-dihydroxypyridine | dodecylbenzene-sulfonic acid |
| 49 | " | 3-cyano-4-methyl-2,6-dihydroxypyridine | — |
| 50 | 3,5-dichloro-2-amino-phenyl oxadiazole with 4-(CH₂N(C₄H₉)₂)phenyl | " | dodecylbenzene-sulfonic acid |
| 51 | 2-amino-phenyl oxadiazole, 4-(CH₂N(C₅H₁₁)₂)phenyl | " | dodecylbenzene-sulfonic acid |
| 52 | 2-amino-phenyl oxadiazole, 4-(CH₂N(C₆H₁₃)₂)phenyl | " | dodecylbenzene-sulfonic acid |
| 53 | 2-amino-phenyl oxadiazole, 4-(CH₂NHC₁₂H₂₅)phenyl | " | dodecylbenzene-sulfonic acid |
| 54 | 2-amino-phenyl oxadiazole, 4-(CH₂NH(CH₂)₃N(CH₃)₂)phenyl | " | dodecylbenzene-sulfonic acid |
| 55 | 2-amino-phenyl oxadiazole, 4-(CH₂NH(CH₂)₃N(C₂H₅)₂)phenyl | 3-cyano-4-methyl-1-methyl-6-oxo-2-hydroxy-pyridine | — |
| 56 | 5-chloro-2-amino-phenyl oxadiazole, 3-(CH₂NH(CH₂)₃N(CH₃)₂)phenyl | 3-cyano-4-methyl-2,6-dihydroxypyridine | dodecylbenzene-sulfonic acid |

-continued

| Ex. | Diazo component | Coupling component | Salt formed with |
|---|---|---|---|
| 57 | (2-aminophenyl)-1,2,4-oxadiazole with 4-(piperidinomethyl)phenyl | " | docedylbenzene-sulfonic acid |
| 58 | (2-aminophenyl)-1,2,4-oxadiazole with 4-(piperidinomethyl)phenyl | " | dodecylbenzene-sulfonic acid |
| 59 | (2-aminophenyl)-1,2,4-oxadiazole with 4-(morpholinomethyl)phenyl —CH$_2$N(morpholine) | " | dodecylbenzene-sulfonic acid |
| 60 | (2-aminophenyl)-1,2,4-oxadiazole with 4-[(4-methylpiperazinyl)methyl]phenyl —CH$_2$N(N—CH$_3$) | " | dodecylbenzene-sulfonic acid |
| 61 | (2-aminophenyl)-1,2,4-oxadiazole with 4-[CH$_2$NH(CH$_2$)$_2$—N(piperazinyl)NH]phenyl | 10 " | dodecylbenzene-sulfonic acid |
| 62 | (2-aminophenyl)-1,2,4-oxadiazole with 4-[CH$_2$NN(CH$_2$)$_2$N(C$_2$H$_5$)$_2$]phenyl | " | dodecylbenzene-sulfonic acid |
| 63 | (2-aminophenyl)-1,2,4-oxadiazole with 2-[SO$_2$NH(CH$_2$)$_2$N(C$_2$H$_5$)$_2$]phenyl | " | dodecylbenzene-sulfonic acid |
| 64 | (2-aminophenyl)-1,2,4-oxadiazole with 2-[SO$_2$NH(CH$_2$)$_3$N(C$_2$H$_5$)$_2$]phenyl | " | dodecylbenzene-sulfonic acid |
| 65 | (2-aminophenyl)-1,2,4-oxadiazole with 2-[SO$_2$NH(CH$_2$)$_3$N(CH$_3$)$_2$]phenyl | 4-methyl-3-cyano-6-hydroxy-1-dodecyl-2-pyridone (CH$_3$, CN, HO, N-C$_{12}$H$_{25}$, O) | — |

-continued

| Ex. | Diazo component | Coupling component | Salt formed with |
|---|---|---|---|
| 66 | [2-amino-phenyl-1,2,4-oxadiazol-3-yl-phenyl-SO₂N(piperazine)N—CH₃] structure with o-aminophenyl-oxadiazole-phenyl-SO₂-N-methylpiperazine | 4-methyl-3-cyano-2,6-dihydroxypyridine (CH₃, CN, HO—N—OH) | dodecylbenzene-sulfonic acid |
| 67 | o-aminophenyl-oxadiazol-phenyl-SO₂NH(CH₂)₂N(CH₃)₂ | " | dodecylbenzene-sulfonic acid |
| 68 | o-aminophenyl-oxadiazol-phenyl-SO₂NH(CH₂)₃N(CH₃)₂ | " | dodecylbenzene-sulfonic acid |
| 69 | Cl-substituted o-aminophenyl-oxadiazol-phenyl-SO₂NH(CH₂)₃N(CH₃)₂ | " | dodecylbenzene-sulfonic acid |
| 70 | o-aminophenyl-oxadiazol-phenyl-SO₂NH(CH₂)₃N(C₂H₅)₂ | " | dodecylbenzene-sulfonic acid |
| 71 | o-aminophenyl-oxadiazol-phenyl-SO₂N(N-methylpiperazine) | " | dodecylbenzene-sulfonic acid |
| 72 | o-aminophenyl-oxadiazol-phenyl-SO₂NH(CH₂)₃N(CH₃)₂ | 4-methyl-3-cyano-6-hydroxy-1-[(CH₂)₃N(C₂H₅)₂]-2(1H)-pyridone | dodecylbenzene-sulfonic acid |
| 73 | o-aminophenyl-oxadiazol-phenyl-SO₂NH(CH₂)₃N(C₂H₅)₂ | 4-methyl-3-cyano-2,6-dihydroxypyridine | dodecylbenzene-sulfonic acid |
| 74 | " | " | dodecylbenzene-sulfonic acid |
| 75 | o-aminophenyl-oxadiazol-phenyl-SO₂NH(CH₂)₃N(C₃H₇)₂ | " | dodecylbenzene-sulfonic acid |

-continued

| Ex. | Diazo component | Coupling component | Salt formed with |
|---|---|---|---|
| 76 | 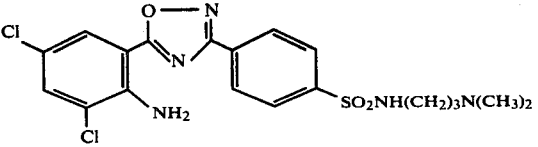 | " | dodecylbenzene-sulfonic acid |
| 77 | 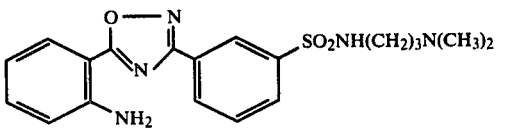 | " | dodecylbenzene-sulfonic acid |
| 78 | " | " | — |
| 79 | 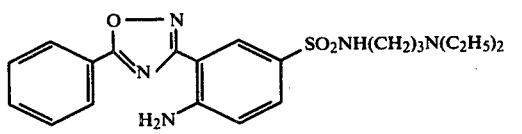 | 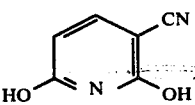 | dodecylbenzene-sulfonic acid |
| 80 | 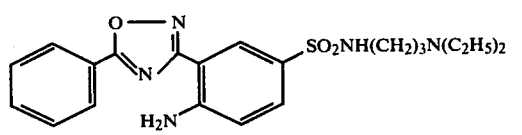 | 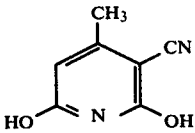 | dodecylbenzene-sulfonic acid |
| 81 | 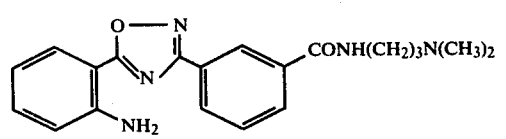 | " | dodecylbenzene-sulfonic acid |
| 82 | 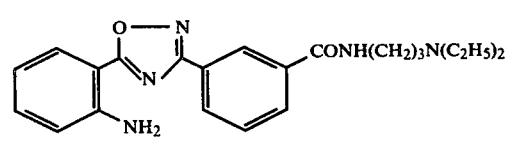 | " | dodecylbenzene-sulfonic acid |
| 83 | 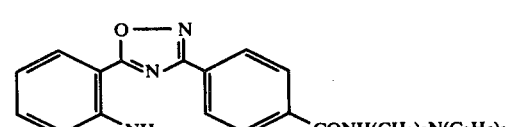 | " | dodecylbenzene-sulfonic acid |
| 84 | 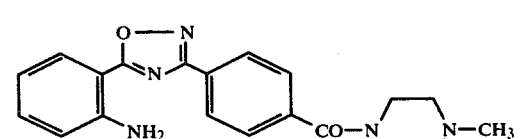 | " | dodecylbenzene-sulfonic acid |
| 85 | 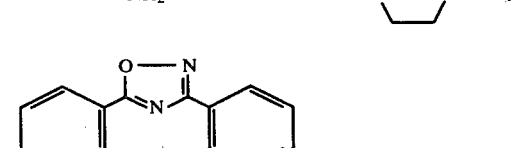 | " | dodecylbenzene-sulfonic acid |
| 86 | 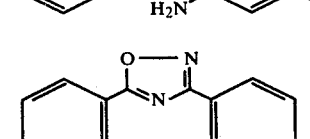 | 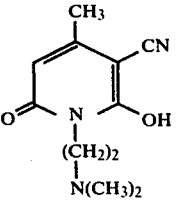 | dodecylbenzene-sulfonic acid |

-continued

| Ex. | Diazo component | Coupling component | Salt formed with |
|---|---|---|---|
| 87 | " | 4-methyl-3-cyano-6-oxo-1-[(CH$_2$)$_3$N(CH$_3$)$_2$]-2-hydroxy-pyridine | — |
| 88 | " | 4-methyl-3-cyano-6-oxo-1-[(CH$_2$)$_3$N(C$_2$H$_5$)$_2$]-2-hydroxy-pyridine | — |
| 89 | " | 4-methyl-3-cyano-6-oxo-1-[(CH$_2$)$_2$NH(CH$_2$)$_2$NH$_2$]-2-hydroxy-pyridine | — |
| 90 | " | 4-methyl-3-cyano-6-oxo-1-[(CH$_2$)$_2$NH(CH$_2$)$_2$NH(CH$_2$)$_2$NH$_2$]-2-hydroxy-pyridine | dodecylbenzene-sulfonic acid |
| 91 | " | 4-methyl-3-cyano-6-oxo-1-[(CH$_2$)$_3$NH(CH$_2$)$_3$NH(CH$_2$)$_3$NH$_2$]-2-hydroxy-pyridine | — |
| 92 | 5-chloro-2-amino-phenyl-3-phenyl-1,2,4-oxadiazole | " | — |
| 93 | " | 4-methyl-3-cyano-6-oxo-1-[(CH$_2$)$_3$N(C$_3$H$_7$)$_2$]-2-hydroxy-pyridine | — |
| 94 | 2-amino-phenyl-oxadiazolyl-phenyl-SO$_2$NH(CH$_2$)$_3$N(CH$_3$)$_2$ | " | dodecylbenzene-sulfonic acid |
| 95 | 3-phenyl-oxadiazolyl-(2-amino-5-SO$_2$NH(CH$_2$)$_3$N(CH$_3$)$_2$)-phenyl | " | dodecylbenzene-sulfonic acid |

| Ex. | Diazo component | Coupling component | Salt formed with |
|---|---|---|---|
| 96 | 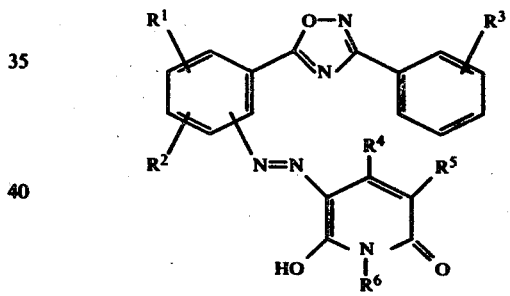 (shown below in table position) | CH3, CN, HO-pyridine-OH | dodecylbenzene-sulfonic acid |
| 97 | | " | dodecylbenzene-sulfonic acid |
| 98 | | " | dodecylbenzene-sulfonic acid |
| 99 | | " | dodecylbenzene-sulfonic acid |

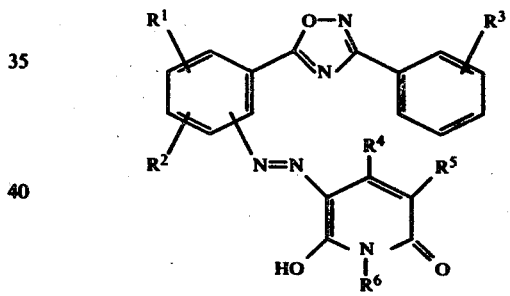

USE EXAMPLE 10 parts of the dye of the formula

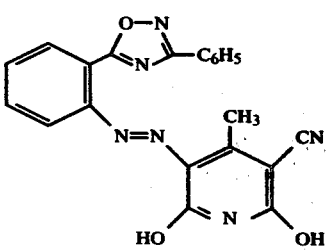

and 0.4 part of the dye obtained as described in Example 1 are mixed thoroughly, in a dispersing apparatus, with from 30 to 40 parts of a resin (eg. a rosin-modified phenol-formaldehyde resin) and from 55 to 65 parts of toluene. This gives a toluene gravure ink which has great tinctorial strength and brilliance, and excellent flow.

What is claimed as new and intended to be covered by Letters Patent is:

1. A compound useful for improving the flowability of pigment-containing printing inks which in the form of the free base corresponds to the formula (structure shown)

where
$R^1$ is hydrogen, chlorine, bromine, methyl, trifluoromethyl, methoxy, nitro or X,
$R^2$ is hydrogen, chlorine or nitro,
$R^3$ is hydrogen, chlorine, bromine, methyl, methoxy, nitro or X,
$R^4$ is hydrogen or alkyl of 1 to 3 carbon atoms,
$R^5$ is cyano, carbamoyl or acetyl,
$R^6$ is hydrogen, $C_1$ to $C_{16}$ alkyl, $C_2$ to $C_8$ alkyl substituted by hydroxy or $C_1$ to $C_8$ alkoxy, cyclohexyl, benzyl, phenylethyl and

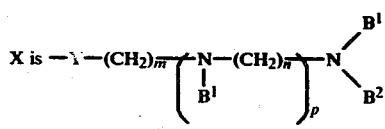

m is 1, 2, 3 or 4
n is 2, 3, or 4
p is 0, 1, 2 or 3
Y is a direct bond, —CONH— or —SO₂NH—, $B^1$ is hydrogen, $C_1$ to $C_{13}$ alkyl or $C_2$ or $C_3$ alkyl substituted by hydroxy or $C_1$ to $C_8$ alkoxy, $B^2$ is hydrogen, $C_1$ to $C_8$ alkyl; $C_2$ or $C_3$ alkyl substituted by hydroxy or $C_1$ to $C_8$ alkoxy; or cyclohexyl and $B^1$ and $B^2$ together with the nitrogen are pyrrolidino, piperidino, methylpiperidino, morpholino, piperazino, N-methylpiperazino or N-β-hydroxyethyl-piperazino with the proviso that the molecule contains at least one group X.

2. A compound according to claim 1 in which $R^1$ is hydrogen, chlorine, methyl or nitro, $R^2$ hydrogen, chlorine or nitro, $R^3$ is hydrogen, chlorine, bromine, methyl or X, $R^4$ is hydrogen or methyl, $R^5$ is cyano, $R^6$ is hydrogen $C_1$ to $C_8$ alkyl, $C_2$ or $C_3$ alkyl substituted by hydroxy or $C_1$ to $C_4$ alkoxy; and X has the meaning given for claim 1.

3. A compound according to claim 1 in which $R^1$ and $R^2$ are hydrogen, $R^3$ is X, $R^4$ is methyl, $R^5$ is cyano, $R^6$ is hydrogen, $C_1$ to $C_4$ alkyl and X has the given meaning.

4. A compound according to claim 1 in which $R^1$, $R^2$ and $R^6$ are hydrogen, $R^3$ is X, $R^4$ is methyl, $R^5$ is cyano and X has the given meaning.

5. A compound according to claim 3 in which $$X \text{ is } (CH_2)_m(NH(CH_2)_n)_p N \diagup^{B^3}_{B^4} ,$$

$B^3$ is $C_1$ to $C_8$ alkyl, $B^4$ is $C_1$ to $C_8$ alkyl, $B^3$ and $B^4$ together with the nitrogen are pyrrolidino, piperidino, morpholino, piperazino or N-methylpiperazino and m, n, p and $R^1$ to $R^6$ have the given meanings.

6. A compound according to claim 4 in which $R^3$ is X and $$X \text{ is } CH_2N \diagup^{B^1}_{B^2} ,$$

$R^1$, $R^2$, $R^4$, $R^5$, $R^6$, $B^1$ and $B^2$ having the given meanings.

7. The compound according to claim 1 of the formula

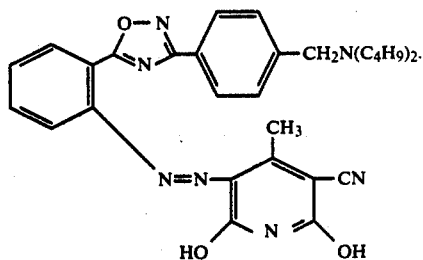

8. A method for improving the flowability of pigment containing printing inks, which comprises adding to said printing ink a compound which in the form of the free base corresponds to the formula

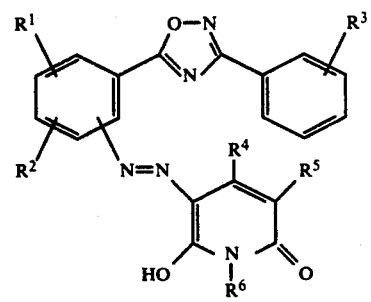

where $R^1$ is hydrogen, chlorine, bromine, methyl, trifluoromethyl, methoxy, nitro or X, $R^2$ is hydrogen, chlorine or nitro, $R^3$ is hydrogen, chlorine, bromine, methyl, methoxy, nitro or X, $R^4$ is hydrogen or alkyl of 1 to 3 carbon atoms, $R^5$ is cyano, carbamoyl or acetyl, $R^6$ is hydrogen, $C_1$ to $C_{16}$ alkyl, $C_2$ to $C_8$ alkyl substituted by hydroxy or $C_1$ to $C_8$ alkoxy, cyclohexyl, benzyl, phenylethyl and

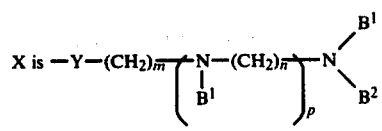

m is 1, 2, 3, or 4 n is 2, 3 or 4 p is 0, 1, 2 or 3

Y is a direct bond, —CONH— or —SO₂NH—, $B^1$ is hydrogen, $C_1$ to $C_{13}$ alkyl or $C_2$ or $C_3$ alkyl substituted by hydroxy or $C_1$ to $C_8$ alkoxy, $B^2$ is hydrogen, $C_1$ to $C_8$ alkyl; $C_2$ or $C_3$ alkyl substituted by hydroxy or $C_1$ to $C_8$ alkoxy; or cyclohexyl and $B^1$ and $B^2$ together with the nitrogen are pyrrolidino, piperidino, methylpiperidino, morpholino, piperazino, N-methylpiperazino or N-β-hydroxyethyl-piperazino with the proviso that the molecule contains at least one group X.

9. The method of claim 8 wherein said printing ink has the formula

10. A printing ink which comprises a pigment of the formula

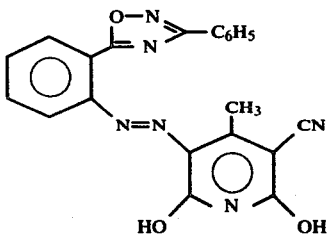

and an amount of an additive sufficient to improve the flowability of said pigment, of the formula

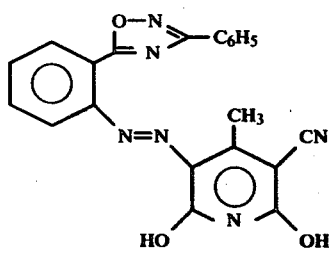

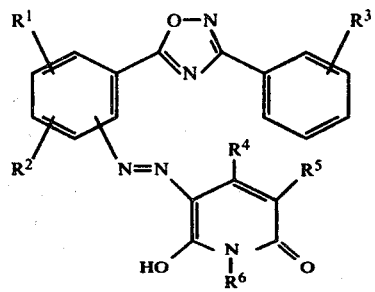

where
R¹ is hydrogen, chlorine, bromine, methyl, trifluoromethyl, methoxy, nitro or X,
R² is hydrogen, chlorine or nitro,
R³ is hydrogen chlorine, bromine, methyl, methoxy, nitro or X,
R⁴ is hydrogen or alkyl of 1 to 3 carbon atoms,
R⁵ is cyano, carbamoyl or acetyl,
R⁶ is hydrogen, $C_1$ to $C_{16}$ alkyl, $C_2$ to $C_8$ alkyl substituted by hydroxy or $C_1$ to $C_8$ alkoxy, cyclohexyl, benzyl, phenylethyl and

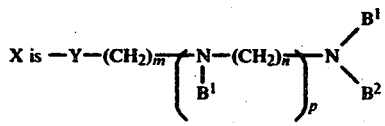

m is 1, 2, 3 or 4
n is 2, 3 or 4
p is 0, 1, 2 or 3
Y is a direct bond, —CONH— or —SO₂NH—,
B¹ is hydrogen, $C_1$ to $C_{13}$ alkyl or $C_2$ or $C_3$ alkyl substituted by hydroxy or $C_1$ to $C_8$ alkoxy.
B² is hydrogen, $C_1$ to $C_8$ alkyl; $C_2$ or $C_3$ alkyl substituted by hydroxy or $C_1$ to $C_8$ alkoxy; or cyclohexyl and
B¹ and B² together with the nitrogen are pyrrolidino, piperidino, methylpiperidino, morpholino, piperazino, N-methylpiperazino or N-β-hydroxyethylpiperazino with the proviso that the molecule contains at least one group X.

* * * * *